May 9, 1950 H. B. R. BOOSMAN 2,507,139
TRANSMITTING-RECEIVING CIRCUIT ARRANGEMENT
Filed July 20, 1946
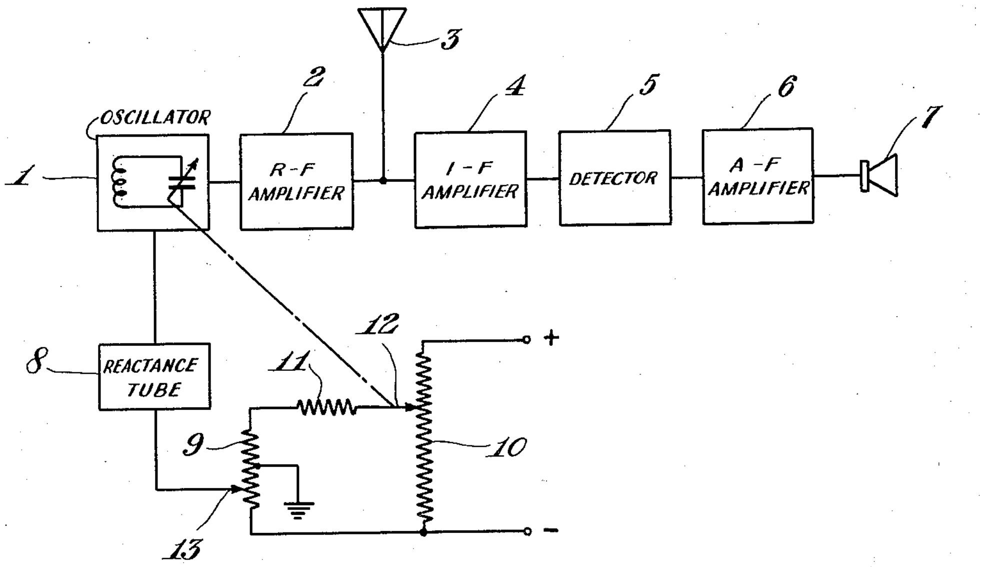
HERMAN BERNARD RUDOLF BOOSMAN
INVENTOR.
BY Fred M. Vogel
AGENT.

Patented May 9, 1950

2,507,139

UNITED STATES PATENT OFFICE 2,507,139

TRANSMITTING-RECEIVING CIRCUIT ARRANGEMENT

Herman Bernard Rudolf Boosman, Eindhoven, Netherlands, assignor to Hartford National Bank and Trust Company, Hartford, Conn., as trustee Application July 20, 1946, Serial No. 685,126
In the Netherlands June 16, 1943

Section 1, Public Law 690, August 8, 1946
Patent expires June 16, 1963

5 Claims. (Cl. 250—13)

This invention relates to a transmitting-receiving station circuit arrangement in which means are provided to adjust the frequency of the transmitter to the frequency of a companion station to which the receiver is tuned. To this end a tuning member (inductance or condenser) of the frequency-determining circuit of the transmitter has hitherto been adjusted in such a manner that the heat tone between the frequency of the transmitter and the frequency of the oscillation entering the receiver and originating from the companion station disappears.

The object of the invention is to provide an improved circuit arrangement of the aforesaid kind and consists in that the circuit of the transmitter which determines the frequency is coupled with a reactance tube whose bias is taken from a potentiometer across which a voltage dependent upon the adjustment of the tuning means of the said circuit is set up.

The invention permits the transmitter to be readjusted from a spot at a distance from the transmitting-receiving installation.

As the voltage of the potentiometer is dependent upon the adjustment of the tuning means of the said circuit, the advantage is obtainable that a definite adjustment of the potentiometer always entails the same frequency variation.

In order that the invention may be clearly understood and readily carried into effect, it will now be explained more fully with reference to the accompanying drawing, given by way of example, in which the sole figure represents one form of construction.

In this form of construction the transmitter comprises a control stage 1, in which the oscillations to be transmitted are generated, and an output stage 2 in which the generated oscillations are amplified and modulated, for instance, by telephony signals. The modulated oscillations may be emitted by an aerial 3. The receiver part of the installation consists of a high- and an intermediate-frequency amplifier 4, a detector 5, a low-frequency amplifier 6 and a loud-speaker 7 in which the signals received in the aerial 3 are reproduced.

In order that the transmitting frequency of the aforesaid installation may be adjusted to the frequency of a companion station, a so-called reactance tube 8, which is connected as an inductance or capacity and to which is supplied a variable bias for adjusting the mutual conductance of the reactance tube, is coupled with the frequency-determining circuit of the control stage 1. This bias is taken from the tap 13 of a potentiometer 9 of which one end is connected to a fixed point of a resistance 10, whereas its other end is connected, through a blocking resistance 11, to a variable point 12 of the resistance 10 across which a constant direct voltage is set up. The adjustment of the point 12 depends on the adjustment of at least one of the tuning members of the control circuit, which is illustrated by a dotted line in the figure. As a result thereof a direct voltage depending on the adjustment of the tuning condenser of the frequency-determining circuit of the control stage 1 is set up across the potentiometer 9 from which is taken the bias for the reactance tube 8. The variation of the voltage set up across the potentiometer 9 as a function of the adjustment of the tuning condenser is preferably such that a predetermined adjustment of the tapping point 13 of the potentiometer 9 involves the same frequency variation throughout the tuning range of the control circuit.

If desired, the potentiometer 9 may be arranged at a certain distance from the transmitting-receiving installation, so that readjustment of the transmitter by adjusting the potentiometer can take place from a spot remote from the transmitting-receiving installation. This is of particular advantage if the tuning means of the transmitter and of the receiver are coupled mechanically and controlled at a distance.

If the invention is applied to a transmitting and receiving installation in which the tuning of the frequency-determining circuit of the transmitter takes place by the simultaneous adjustment of a tuning inductance and a tuning condenser, another resistance is preferably arranged in parallel with the resistance 10, and a variable tapping point of this second resistance, whose adjustment depends on the adjustment of the tuning inductance, is connected through a blocking resistance to the end of the blocking resistance 11 which is connected with the potentiometer 9. As a result of this a voltage appears across the potentiometer 9, which depends both on the adjustment of the tuning condenser and on the adjustment of the tuning inductance of the frequency-determining circuit of the control stage.

What I claim is:

1. In a transceiver radio station provided with a tunable receiver, a transmitter including an adjustable resonant circuit adapted to control the carrier frequency thereof and means coupling said transmitter and said receiver for simultaneous operation to produce a beat tone in said receiver proportional to the difference in frequency between the carrier frequency of said transmitter and the frequency of a companion station to which said receiver is tuned, apparatus for aligning the carrier frequency of said transmitter with the frequency of a companion station to which said receiver is tuned, said apparatus comprising an electronic reactance tube coupled to said adjustable resonant circuit to vary the carrier frequency of said transmitter, a potentiometer having a movable tap, means to apply across said potentiometer a direct voltage whose value depends on the setting of said adjustable resonant circuit, and means to apply the voltage established at the tap of said potentiometer as a control voltage on said tube whereby said tap may be moved to a position effecting zero beat.

2. In a transceiver radio station provided with a tunable receiver, a transmitter including a resonant circuit adapted to control the carrier frequency of said transmitter, said resonant circuit being adjustable throughout a predetermined range and means coupling said transmitter and said receiver for simultaneous operation to produce a beat tone in said receiver proportional to the difference in frequency between the carrier frequency of said transmitter and the frequency of a companion station to which said receiver is tuned, apparatus for aligning the carrier frequency of said transmitter with the frequency of a companion station to which said receiver is tuned, said apparatus comprising an electronic reactance tube coupled to said adjustable resonant circuit to vary the carrier frequency of said transmitter, a potentiometer having a movable tap, means to apply across said potentiometer a direct voltage whose value is proportional to the setting of said adjustable resonant circuit within said range, and means to apply the voltage established at the tap of said potentiometer as a control voltage on said tube whereby a given change in the position of said tap results in the same variation in the carrier frequency of said transmitter for any setting of said adjustable resonant circuit in said range.

3. Apparatus, as set forth in claim 2, wherein said means to apply across said potentiometer a direct voltage proportional to the setting of said resonant circuit comprises a second potentiometer having a movable tap coupled for synchronous movement with the adjustment of said resonant circuit within said range, a source of direct voltage connected across said second potentiometer, and means to apply the voltage developed between the tap and one end of said second potentiometer across the first potentiometer.

4. In a transceiver radio station provided with a tunable receiver, a transmitter including a resonant circuit controlling the carrier frequency of said transmitter, said resonant circuit having a variable reactance element and means coupling said transmitter and said receiver for simultaneous operation to produce a beat tone in said receiver proportional to the difference in frequency between the carrier frequency of said transmitter and the frequency of a companion station to which said receiver is tuned, apparatus for aligning the carrier frequency of said transmitter with the frequency of a companion station to which said receiver is tuned, said apparatus comprising a grid-controlled reactance tube coupled to said resonant circuit to vary the carrier frequency of said transmitter, a first potentiometer having a movable tap, means to apply the voltage established at the movable tap of said first potentiometer as a bias on the grid of said reactance tube, a second potentiometer having a movable tap mechanically coupled to said variable reactance element for concurrent adjustment therewith, a source of constant direct voltage connected across said second potentiometer, and means for applying the voltage developed between the tap and one end of said second potentiometer across said first potentiometer.

5. Apparatus, as set forth in claim 4, further including a blocking resistor in series with the tap of said second potentiometer and the end of said first potentiometer connected thereto.

HERMAN BERNARD RUDOLF BOOSMAN.

REFERENCES CITED

The following references are of record in the file of this patent:

UNITED STATES PATENTS

| Number | Name | Date |
|---|---|---|
| 1,245,166 | Ureeland | Nov. 6, 1917 |
| 1,524,413 | Sterns | Jan. 27, 1925 |
| 2,245,662 | Foster | June 17, 1941 |
| 2,245,717 | Roberts | June 27, 1941 |
| 2,317,547 | McRae | Apr. 27, 1943 |
| 2,323,598 | Hathaway | July 6, 1943 |
| 2,339,608 | Alvira | Jan. 18, 1944 |
| 2,355,338 | Stewart | Aug. 8, 1944 |
| 2,363,583 | Gilman | Nov. 28, 1944 |
| 2,416,794 | Crosby | Mar. 4, 1947 |
| 2,491,540 | Wiseman et al. | Dec. 20, 1949 |